3,454,371
Patented July 8, 1969

---

3,454,371
METHODS OF PREPARING CHLORODIFLUOROAMINE
Carl J. Schack, Chatsworth, Calif., assignor to North American Rockwell Corporation
No Drawing. Filed June 21, 1966, Ser. No. 559,332
Int. Cl. C01b 21/18
U.S. Cl. 23—356     1 Claim

ABSTRACT OF THE DISCLOSURE

A method for preparing chlorodifluoramine (1) by reacting difluoramine with chlorine in the presence of cesium fluoride and (2) by reacting difluoramine and chlorinemonofluoride. The compound chlorodifluoramine can be used for preparing N-F oxidizers and monopropellants.

---

This invention relates to the preparation of compounds containing nitrogen-to-fluorine bonds. More particularly, the present application is directed to methods for the preparation of chlorodifluoramine.

Chlorodifluoramine, $ClNF_2$, is a compound which is used as a starting compound for the preparation of N-F compounds such as tetrafluorohydrazine, a very high energy oxidizer. Chlorodifluoramine is also used in the preparation of other oxidizers and monopropellants. In the prior art, chlorodifluoramine has been prepared by the reaction of difluoramine with boron trichloride at low temperatures. This constitutes an expensive process because of the high cost of the latter chemical and the relatively low yield.

It is, therefore, an object of this invention to provide improved processes for the preparation of chlorodifluoramine.

It is a further object of this invention to provide simple processes for the rapid preparation of this compound in high yields from easily handled starting materials.

Additional objects will become apparent from the following description of the invention.

The objects of the present invention are accomplished by a process which comprises reacting $HNF_2$ with either $Cl_2$ in the presence of CsF or with ClF alone.

One embodiment of the invention involves the reaction of chlorine with $HNF_2$ in the presence of CsF. The products resulting therefrom will be HCl and the desired $ClNF_2$. The reaction equation is:

(1) 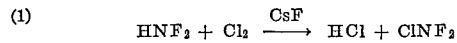
$$HNF_2 + Cl_2 \xrightarrow{CsF} HCl + ClNF_2$$

Similar reactions using KF and RbF have been attempted in the prior art. These reactions were generally unsatisfactory, due to long reaction times and poor yields. CsF has been found to be unexpectedly successful in promoting both the rate and yield of the reaction.

The above Reaction 1 may occur in either the gaseous or the liquid state. In the preferred practice of this facet of the invention, stoichiometric quantities of the reactant gases are frozen together in the absence of CsF, at temperatures down to −142° C. in an evacuated reactor. Upon removal of the cooling means, the frozen gases will vaporize. They are allowed to mix and then come in contact with solid CsF. Reaction ensues and may be allowed to proceed for about two hours, or until the reactor warms to ambient temperature, whichever is quicker. If desired, however, the reaction may be run as high as 30° C. The reactor is then opened and the volatile contents vacuum fractionated. If either excess $HNF_2$ or $Cl_2$ is present over the indicated reaction stoichiometry, it is trapped at −142° C. The desired product, $ClNF_2$ which is the only N-F compound found other than the starting material will be trapped at −196° C. Yields of over 90% may be expected.

Certain precautions must be taken in the performance of this synthesis. If $HNF_2$ is cooled to less than −142° C., or if it is frozen solid, it may explode upon later warming. Liquid $HNF_2$ should not be allowed to contact CsF, since a complex is readily formed and this complex always explodes on warming above about −30° C.

No specially designed appartus is required for the described synthesis, and all materials used are compatible with ordinary Pyrex glass. Metal apparatus is not generally satisfactory, as a side reaction producing $N_2F_4$ from the decomposition of $HNF_2$ may occur. The reaction should be conducted in the dark, since light promotes a photolytic side reaction resulting in the formation of some $N_2F_4$. The equation of this reaction is not known. No solvent, stirring or special technique is required for the successful production of the $ClNF_2$. In general, the temperatures used for this reaction are those wherein both $HNF_2$ and $Cl_2$ are gases. Room temperature is most convenient, but higher temperatures may be used. Due to the high reactivity of the starting materials, the reaction should be conducted in vacuo. Initiation of the reaction occurs upon intermolecular mingling of the reactants. The exact time of initiation of the reaction may be determined by using means known in the art to sense a pressure rise in the reactor. Such a pressure rise indicates the inception of reaction. The reaction time may vary. However, essentially complete reaction is achieved within two hours. The exact time of completion may be determined by using means known in the art to detect the leveling off of the pressure rise in the reactor.

Another embodiment of the invention involves the reaction of ClF with $HNF_2$, yielding HF and the desired $ClNF_2$. The hypothesized reaction equation is:

(2) 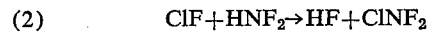
$$ClF + HNF_2 \rightarrow HF + ClNF_2$$

This reaction surprisingly produces yields of $ClNF_2$ in excess of 95% in a few minutes. Moreover, the reaction is neither explosive nor excessively exothermic, if properly carried out. The safe, essentially quantitive reaction of these two exotic, reactive compounds is entirely unexpected. The reaction may be conducted in either the liquid or gaseous state. In the preferred method of synthesis, stoichiometric quantities of the gases ClF and $HNF_2$ are frozen separately in an evacuated reactor, which is then closed and allowed to warm up toward ambient temperature. If an excess of either reactant is used, it may be later separated as described below. After several minutes, the reactor is opened and the products vacuum fractionated. Excess $HNF_2$ and product HF are removed at −142° C. $ClNF_2$ is trapped at −196° C. ClF, if present, will also be trapped at −196° C. It may be separated from $ClNF_2$ by chemical complexing, using means known in the art. An example would be complexing with an alkali-metal fluoride selected from the group consisting of KF, CsF, and RbF. Near stoichiometric quantities of reactants in Reaction 2 give 95% or better conversion to $ClNF_2$ in 30 minutes or less.

As previously mentioned, $HNF_2$ in Reaction 2 should not be cooled below −142° C. The reactants are most suitably reacted in per-halogenated plastics such as Kel-F or Teflon. Metal systems are not as desirable since $HNF_2$ may decompose in these to form $N_2F_4$. The reaction proceeds so rapidly that ambient temperature is not usually reached in the described method. However, the reaction does proceed equally satisfactorily at ambient temperatures or above, even as high as about 30° C. The reaction should be conducted in vacuo for the previously mentioned reasons.

Either of the above reaction schemes may be suitably and easily converted to a flow basis. In both cases, the reactants will react satisfactorily in either a liquid or gaseous state and the resultant products may be suitably separated by flow distillation. Such flow methods are especially suitable for large scale production. The same precautions as were previously outlined must be taken to avoid the formation of undesirable by-products. Additionally, in large scale reactions, problems of heat transfer may be encountered, since this reaction is exothermic. These problems may be solved, for instance, by the inclusion of inert gas in the reaction system. The inert gas would act as a moderator.

The following examples illustrate the process of this invention.

Example I.—Preparation of $ClNF_2$ using $HNF_2+Cl_2$

Approximately 0.5 g. of dry, powdered CsF was loaded into the bottom of a glass ampoule in a dry box. The ampoule was then evacuated and successively, 17.3 cc. of $HNF_2$ (0.772 mmoles) and 34.6 cc. of $Cl_2$ (1.54 mmoles) gas were condensed into a side-arm of the ampoule at $-142°$ C. The ampoule was then closed; placed in a dark, covered container; and allowed to warm to room temperature. After 2 hours and 15 minutes the glass ampoule was opened and the gaseous products vacuum fractionated. Chlorine with a trace of ClNO was removed at $-142°$ C. No $HNF_2$ was observed. A liquid nitrogen cooled trap contained a gaseous mixture composed of 90% $ClNF_2$ and 10% $N_2F_4$ (composition based on IR absorbencies). The measured yield of $ClNF_2$ therefore was 80% based on $HNF_2$ reacted and 90% of the total N-F products.

Example II

Using the same apparatus and technique as above, 28.4 cc. of $Cl_2$ (1.27 mmoles) and 21.6 cc. of $HNF_2$ (9.64 mmoles) were reacted over CsF for 1.5 hours. Vacuum fractionation resulted in the recovery of 5% of the starting $HNF_2$ in addition to the excess of $Cl_2$ over the 1:1 reaction stoichiometry. Besides these materials trapped at $-142°$ C., the $-196°$ C. trap gave the desired $ClNF_2$ product. The $ClNF_2$ was not contaminated with any other N-F compound detectable by infrared spectroscopy but did contain some HCl which was removable by fractionation at $-156°$ C. The yield of $ClNF_2$ was 94% based on the amount of $HNF_2$ used and nearly 100% based on the amount of $HNF_2$ consumed.

Example III.—Preparation $ClNF_2$ using $HNF_2+ClF$

Difluoramine and ClF were reacted in an all plastic reactor (Teflon and Kel-F). 31.8 cc. of difluoramine (1.42 mmoles) was condensed into the evacuated reactor at $-142°$ C. followed by 31.5 cc., of ClF (1.40 mmoles). The ClF was measured by difference since it has some vapor pressure at $-142°$ C. ($\sim 5$ mm.). The reactor was closed and the temperature changed gradually to $-78°$ C. After 30 minutes, the reactor was opened and the contents vacuum fractionated. HF was trapped at $-142°$ C. and no $HNF_2$ was found. The desired product, $ClNF_2$, was found in a liquid nitrogen cooled trap mixed with some $N_2F_4$. The yields were approximately 91% $ClNF_2$ (29 cc.) and 9% $N_2F_4$ (3 cc.) based on the $HNF_2$ used and consumed.

Since it is obvious that many changes and modifications can be made in the above-described details without departing from the nature and spirit of the invention, it is to be understood that the invention is not to be limited thereto except as set forth in the appended claim.

I claim:
1. The process for producing $ClNF_2$ which comprises reacting $HNF_2$ with ClF at between $-142°$ C. and about $30°$ C.

References Cited

UNITED STATES PATENTS

| 3,077,377 | 2/1963 | Lawton et al. | 23—356 |
| 3,281,217 | 10/1966 | Firth | 23—356 |
| 3,314,770 | 4/1967 | Knipe et al. | 23—356 |

OSCAR R. VERTIZ, *Primary Examiner.*

HOKE S. MILLER, *Assistant Examiner.*